H. P. J. EARNSHAW.
TRUCK.
APPLICATION FILED MAR. 29, 1916.
1,203,861.
Patented Nov. 7, 1916.
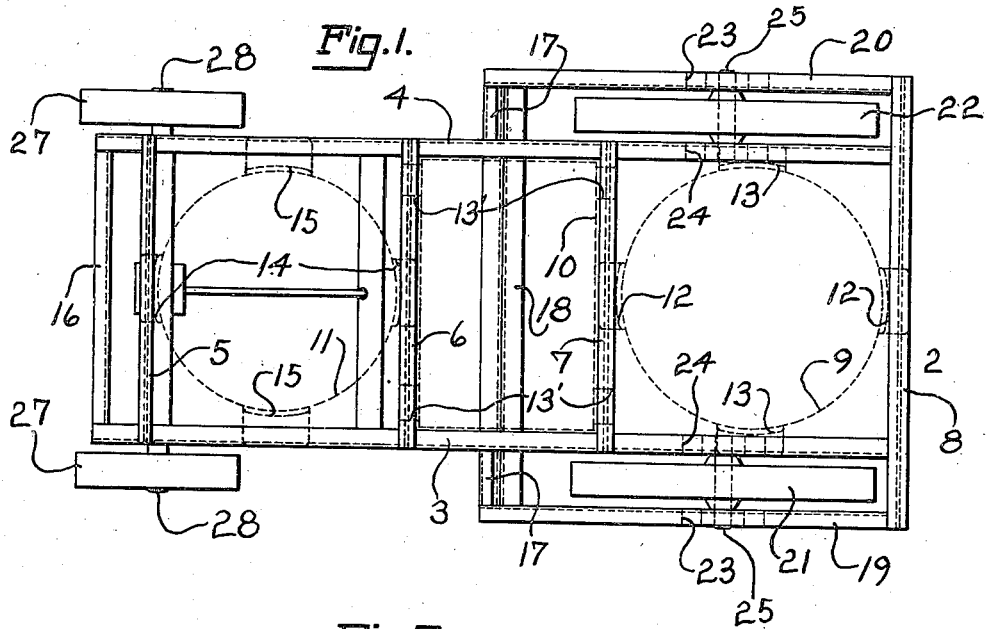
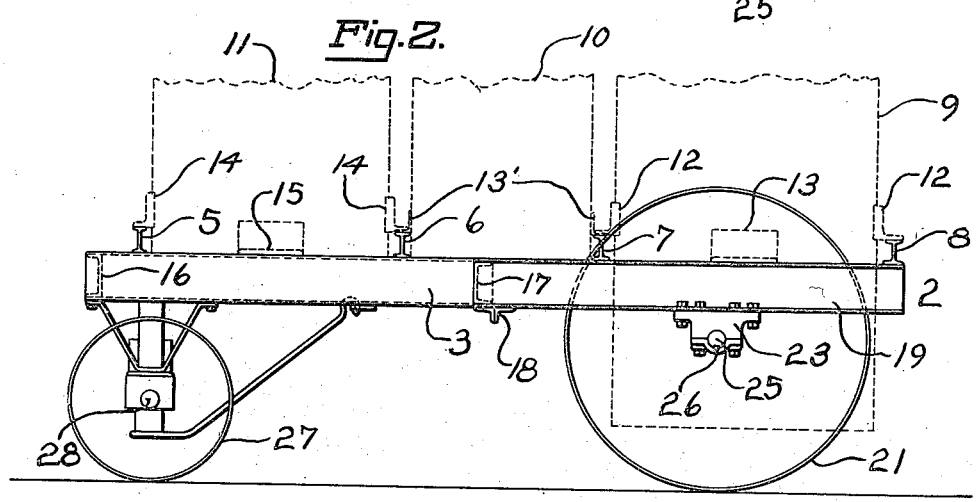
Inventor
Henry P. J. Earnshaw
By Hurt Sutherland
Attorney

UNITED STATES PATENT OFFICE.

HENRY P. J. EARNSHAW, OF BOSTON, MASSACHUSETTS, ASSIGNOR TO EARNSHAW MANUFACTURING COMPANY, INCORPORATED, OF HARTFORD, CONNECTICUT, A CORPORATION OF CONNECTICUT.

TRUCK.

1,203,861.   Specification of Letters Patent.   Patented Nov. 7, 1916.

Application filed March 29, 1916.   Serial No. 87,399.

*To all whom it may concern:*

Be it known that I, HENRY P. J. EARNSHAW, a citizen of the United States, residing at Boston, in the county of Suffolk and State of Massachusetts, have invented certain new and useful Improvements in Trucks, of which the following is a specification.

This invention relates to trucks, the object of the invention being to provide a simple and effective construction by which the body of the truck receives the strains and stresses of the rear axles.

The device possesses other features of advantage and novelty, which with the foregoing will be stated at length in the following description wherein I will set forth fully that form of embodiment of the invention which I have selected for illustration in the drawings accompanying and forming part of the present specification. I do not limit myself to this exact showing; I may depart therefrom in many particulars within the scope of the invention defined by the claims following said description.

Referring to said drawings: Figure 1 is a top plan view, and Fig. 2 a side elevation of a truck embodying my invention.

Like characters refer to like parts in both views.

A truck involving my invention may be used with advantage in many and widely different connections, although it is of especial utility when forming part of the equipment of what is known as a "portable power plant." Said truck comprises in its makeup a body such as that denoted in a general way by 2. Said body as illustrated has duplicate sides or rails 3 and 4 which may if desired consist of channel irons with their open sides facing inward. At intervals said side members 3 and 4 may be connected by struts as 5, 6 and 7 of which there are as shown three, said struts surmounting the sides and being suitably rigidly united therewith. The struts conveniently may consist of I-irons. Surmounting the sides 3 and 4 at the rear end thereof and also suitably rigidly connected therewith is the transverse member 8 situated as shown approximately at the rear end of the body 2. The parts 5, 6, 7 and 8 are shown as being in horizontal alinement and as practically equidistantly spaced. When the truck constitutes part of a power plant, it may support a boiler as 9, a water tank as 10, and an air tank as 11, which are illustrated only in dotted lines. The boiler has fastened to it at practically diametrically opposite points the companion brackets 12 of virtually L-form in cross section and the horizontal portions of which rest upon and are secured to the struts 7 and transverse piece 8 respectively. The boiler extends downward between said elements 7 and 8 and below the sides 3 and 4 of the body. For additional security the boiler may be provided with side brackets 13 adapted to be fastened to the side members or rails 3 and 4. The water tank 10 is shown equipped with brackets 13' fastened thereto and resting on and secured to the struts 6 and 7 between which said tank is situated. The air tank 11 is shown furnished with practically similar brackets 14 attached thereto and suitably united with the struts 5 and 6, the air tank being further held in position by side brackets 15 fastened thereto and also to the body sides 3 and 4. In addition to the struts 5, 6 and 7 there may be disposed between the sides 3 and 4, and suitably united thereto, the strut or cross piece 16 disposed as shown practically at the front of the body 12. I might note at this point that where it is necessary to rigidly connect the parts bolts, rivets or other convenient means may be provided.

For additional security the transverse member 18 may be provided. This transverse member is under and practically midway of the frame, being fastened as in one of the ways already set forth to the under face of the sides 3 and 4, and consisting as shown of L or angle irons abutting and secured together to obtain a T-shaped structure. This member extends outward from the sides 3 and 4 of the body a distance corresponding to the projection outwardly of the terminal portions of the transverse element 8. Connecting the extended ends of the parts 8 and 18 on opposite sides of the body are the duplicate parts 19 and 20 which as shown are of channel irons with their channels facing outwardly. The forward ends of these parts 19 and 20 overlie the extended ends of the parts 18, while the rear ends of said parts 19 and 20 underlie the similarly extended ends of the part 8, said parts 19 and 20 being rigidly secured to the associated elements. The parts 19 and 20 extend from the rear end and toward but short of the front end of the body 2, being spaced or separated from and parallel with the sides 3 and 4. I may if desired, dispose between the parts 19 and 20 and the respective sides 3 and 4 the filling or spacing pieces 17 bolted or otherwise suitably secured in place.

I might observe at this point that the extended ends of the parts 8 and 18 with the elements 19 and 20 and the parts 17 constitute what I term "outriggers"; as a matter of fact they practically constitute loops adapted to receive within them the rear wheels 21 and 22. The members 19 and 20 are provided with pendent boxes or bearings as 23 complemental to the transversely alined boxes or bearings as 24 fastened to and depending from the sides 3 and 4. Said parts 17 are disposed between the front ends of the parts 23 and the adjacent sides 3 and 4 respectively being held rigidly suitably in place. Each pair of boxes 23 and 24 is adapted to receive an axle as 25, the two axles being coaxial and being keyed in the present case to the lower removable sections of the respective boxes, the keys being designated by 26. The axles 25 in the present case, therefore, do not rotate, the wheels 21 and 22 turning on them. As will be understood the wheel 21 turns freely in the space between the parts 19 and 3, while the wheel 22 turns freely in the space between the parts 20 and 4. I have described one simple way of mounting the wheels; others can be adopted instead thereof. There is an advantage, however, in the mount set forth, because should it be necessary to take off either wheel, it becomes a simple matter to remove the lower sections of the appropriate boxes, drive the axle from the wheel in question and then lift the latter out of the space which it occupies.

The front wheels are denoted by 27, and their axles 28 may be connected with the body 2 in any of the ways common in this art, the invention not concerning this point.

It will be clear that when a boiler such as 9 is mounted on the body 2, the strains or stresses of the transversely alined axles 25 are not transferred to the boiler, which is a feature of some importance when the truck is used for the specific purpose hereinbefore mentioned. It will be obvious that I do not restrict myself to any particular employment for the truck which is susceptible of general use. It is a fact that the effect of the axles is taken directly by the body.

While I have described the fact that certain of the parts may be held in position in any desirable manner, mentioning bolts among other illustrations, I prefer that the crosspiece 8 be bolted in position and also that the boiler 9 be bolted to its supporting means, in view of which when necessary the boiler can be readily removed. To accomplish this the part 8 will be taken off and the boiler disconnected from its supporting means prior to which the boiler is mounted on a suitable fixed part. When this is done the truck is driven forward, leaving the boiler on the fixed support. Heretofore derricks and other cumbersome appliances have been required to mount a boiler.

What I claim is:

1. A vehicle frame having a body comprising parallel sides, a transverse connecting member connected with the sides between the ends thereof and extending outwardly therefrom, a second transverse connecting member connected with said sides and also extending outwardly therefrom, one of said connecting members being located above and the other beneath said sides, longitudinally extending connecting members overlying and underlying the extended portions respectively of the transverse connecting members, axles supported by the sides and also by the longitudinally extending members, and wheels on the axles, between said sides and respective longitudinally extending members.

2. A vehicle frame having a body comprising parallel sides, struts spaced from each other longitudinally of the body and connecting the sides, a transverse connecting member connected with the sides between the ends thereof and extending outwardly therefrom and located beneath said sides, a second transverse connecting member located above said sides approximately at the end of the body and extending outwardly from the body at opposite ends thereof, longitudinally extending connecting members overlying and underlying the extended portions respectively of the transverse connecting members, axles supported by the sides and also by the longitudinally extending members, and wheels on the axles, between said sides and respective longitudinally extending members.

3. A vehicle frame having a body comprising sides, transverse members connected with the sides and extending outwardly therefrom, members extending longitudinally of the frame and connecting said extended portions to thereby provide outriggers, wheels within said outriggers, coaxial axles on which said wheels are mounted and carried respectively by the sides and longitudinally extending connecting members, and the rear one of said transverse members being bolted to said sides, the two transverse members being separated longitudinally of the body to receive therebetween a boiler.

In testimony whereof I affix my signature in presence of two witnesses.

HENRY P. J. EARNSHAW.

Witnesses:
L. L. MARKEL,
HEATH SUTHERLAND.